United States Patent
Westlund et al.

(10) Patent No.: US 9,150,134 B2
(45) Date of Patent: Oct. 6, 2015

(54) SERVICE CONTROL PANEL

(75) Inventors: Bjorn E. Westlund, Mahomet, IL (US);
Wayne E. Shaw, La Mesa, CA (US)

(73) Assignee: Caterpillar Inc., Peoria, IL (US)

( * ) Notice: Subject to any disclaimer, the term of this patent is extended or adjusted under 35 U.S.C. 154(b) by 508 days.

(21) Appl. No.: 13/551,989

(22) Filed: Jul. 18, 2012

(65) Prior Publication Data
US 2014/0022707 A1    Jan. 23, 2014

(51) Int. Cl.
H02B 13/00    (2006.01)
B60P 1/00    (2006.01)
E02F 9/20    (2006.01)

(52) U.S. Cl.
CPC . B60P 1/00 (2013.01); E02F 9/2004 (2013.01)

(58) Field of Classification Search
USPC ......... 361/601, 610, 615, 621–622, 627–628, 361/631, 643, 647, 658, 726–733, 752, 755, 361/829, 832, 837
See application file for complete search history.

(56) References Cited

U.S. PATENT DOCUMENTS

| | | | |
|---|---|---|---|
| 3,489,912 A | 1/1970 | Hoffman, Jr. | |
| 3,500,668 A | 3/1970 | Henry | |
| 3,774,234 A | 11/1973 | Blair | |
| 4,190,755 A | 2/1980 | Rogers | |
| 4,349,861 A | 9/1982 | Zizza | |
| 5,025,171 A * | 6/1991 | Fanta et al. | 307/150 |
| 5,433,296 A | 7/1995 | Webberley | |
| 5,895,987 A * | 4/1999 | Lo et al. | 307/125 |
| 6,181,256 B1 * | 1/2001 | Fitzsimmons et al. | 340/12.55 |
| 6,822,347 B2 | 11/2004 | Roley | |
| 7,234,655 B2 | 6/2007 | Umeda | |
| 8,289,681 B2 * | 10/2012 | Kanaya et al. | 361/624 |
| 8,644,007 B2 * | 2/2014 | Pearce et al. | 361/610 |
| 8,780,534 B2 * | 7/2014 | Gibbons | 361/643 |
| 2009/0314615 A1 * | 12/2009 | Christensen et al. | 200/17 R |
| 2010/0008022 A1 * | 1/2010 | Christensen et al. | 361/605 |
| 2011/0050430 A1 | 3/2011 | Wright et al. | |
| 2014/0138218 A1 * | 5/2014 | Westlund et al. | 200/43.16 |

* cited by examiner

Primary Examiner — Courtney Smith
(74) Attorney, Agent, or Firm — Leydig, Voit & Mayer, Ltd.; Tarun Boddu

(57) ABSTRACT

A service control center is provided on a machine at a position accessible to a service technician or an operator. The service control center includes a service control panel. Further, the service control panel includes a first rotary switch adapted to selectively operate a transmission locking system and a second rotary switch adapted to selectively operate an engine starter system. A first flange having a first opening configured to retain the first rotary switch in a locked position and a second flange having a second opening configured to retain the second rotary switch in a locked position.

20 Claims, 4 Drawing Sheets

SERVICE CONTROL PANEL

TECHNICAL FIELD

The present disclosure relates to a service control panel for a machine, and more particularly to a service control panel having an authorized access.

BACKGROUND

A service control panel is used for controlling different machine units associated with operations of a machine during service or maintenance. For example, U.S. Pat. No. 6,822,347 discloses a method for servicing a machine having a control system with a plurality of input devices, an electronic controller and a plurality of machine systems being controlled by the electronic controller. The service control box includes a lock apparatus to permit the box to be closed and locked by a service technician, thereby preventing unauthorized access to the inside of the service control box. The method including the steps of accessing the service control box and moving a service control switch to a service control position, wherein moving the service control switch to the service control position causes at least one of the machine systems to be deactivated and at least one of the machine control systems to be activated. However, there is still room for improvement in the art.

SUMMARY

In one aspect, the present disclosure describes a service control center for a machine. The service control center includes a service control panel. The service control panel includes a first rotary switch and a second rotary switch adapted to selectively operate a transmission locking system and an engine starter system respectively. Further, a first flange having a first opening configured to retain the first rotary switch in a locked position and a second flange having a second opening configured to retain the second rotary switch in a locked position.

In another aspect, a control system operatively connects the service control panel and machine systems for example, but not limited to, the transmission locking system and the engine starter system.

Other features and aspects of this disclosure will be apparent from the following description and the accompanying drawings.

DETAILED DESCRIPTION

Figure 1:
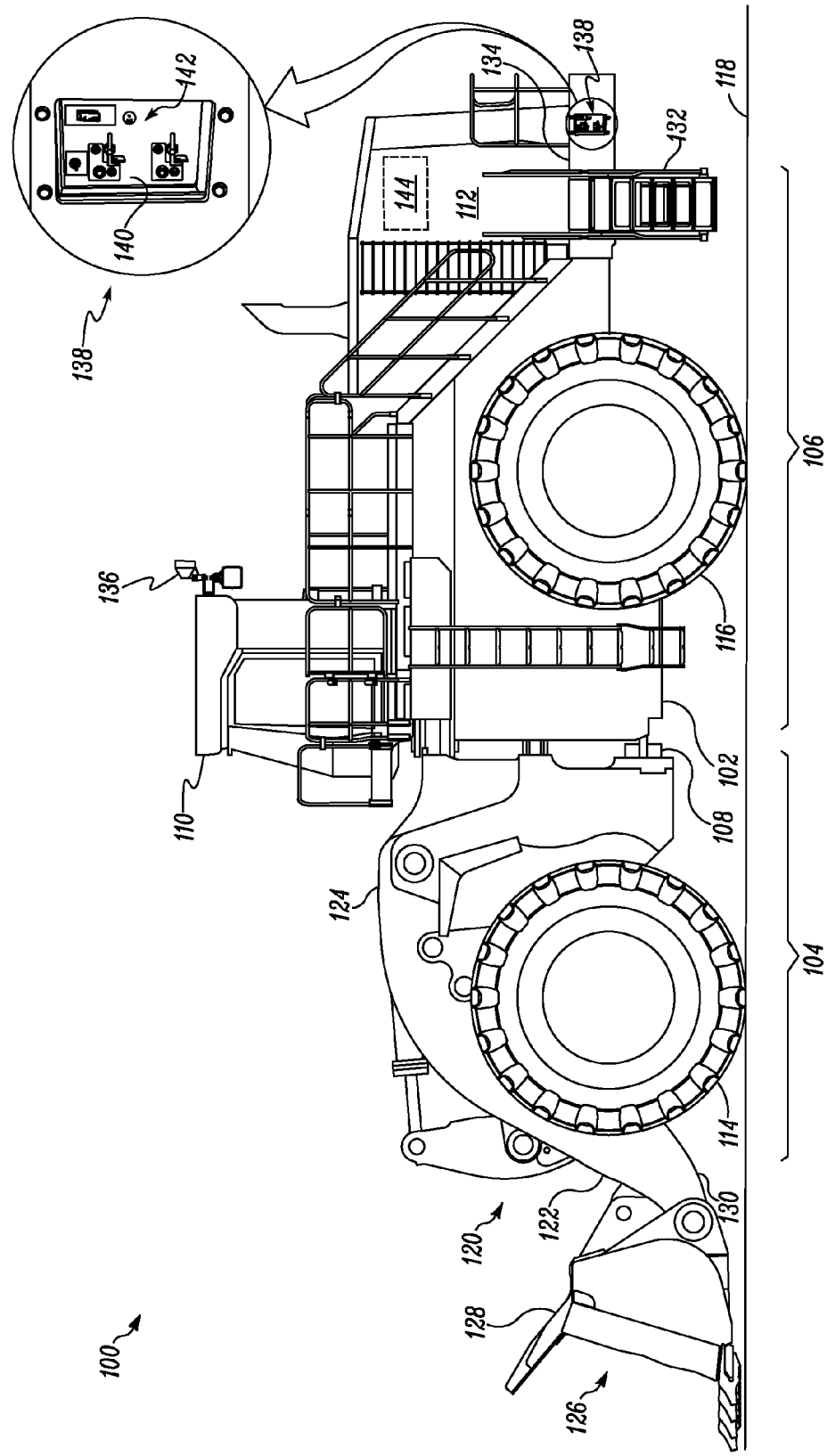
FIG. 1 illustrates a side view of a machine according to an embodiment of the present disclosure.

The present disclosure relates to a service control panel with rotary switches adapted for use with a machine which are easily accessible to a service technician or an operator. FIG. 1 illustrates a side view of a machine 100, such as a wheel loader, in which various embodiments of the present disclosure may be implemented. Although, the machine 100 is embodied as the wheel loader, the machine 100 may include, but not limited to, an off-highway truck, on-highway truck, a backhoe loader, an industrial loader, a skidder, a wheel tractor, an excavator, a wheel dozer, an articulated truck, a asphalt paver, a cold planer, a compact track and multi terrain loader, a compactor, a feller buncher, a forest machine, a forwarder, a harvester, a motor grader, a hydraulic shovel, a road reclaimer, a tele-handler, a mining machine or the like. The machine 100 may be used for lifting and/or handling a load and may be employed in various industries such as, but not limited to, construction and mining.

In an exemplary embodiment, as illustrated in FIG. 1, the machine 100 may include a frame 102. The frame 102 may include a front section 104 and a rear section 106. In an embodiment, the front section 104 may be connected with the rear section 106 by articulated joints 108. The rear section 106 of the machine 100 may include an operator cab 110 above an engine enclosure 112. As well known in the art, an engine (not shown) may be housed within the engine enclosure 112. The engine is used to provide power to a final drive assembly, via a mechanical or electrical transmission. The operator cab 110 may include one or more control means to control the operations of the machine 100.

The machine 100 may be supported by ground engaging elements, such as a pair of front wheels 114 (only one side is shown) mounted on the front section 104 and a pair of rear wheels 116 (only one side is shown) mounted on the rear section 106. The front and the rear wheels 114 and 116 may support the machine 100 on a ground 118. In an embodiment, the machine 100 may include a lift arm assembly 120 mounted on the front section 104 of the frame 102. The lift arm assembly 120 may include a lift arm 122 pivotally mounted to the front section 104 at a first end 124. The lift arm assembly 120 may further include an implement 126, such as a bucket 128 pivotally mounted to a second end 130 of the lift arm 122. It will be apparent to a person having ordinary skill in the art that in various other embodiments, the implement 126 may include, but not limited to, a blade, a fork, a grapple, a hammer or the like.

The machine 100 further include a powered access ladder 132 to provide operators or service technicians access to a platform 134. The powered access ladder 132 is maintained at raised or folded position during the operation of the machine 100 and at lowered position to climb on or get down of the machine 100. Moreover, a stairway flood light 136 may be provided on the operators cab 110 of the machine 100. In an embodiment, the powered access ladder 132 may include plurality of inbuilt lighting members, but not limited to, LED.

In an embodiment, the machine 100 may include a service control center 138 adapted to be positioned on the machine 100 in a location accessible to the operator or the service technician preferably from the platform 134 and the ground 118. The service control center 138 may include a service control panel 140. The service control panel 140 may provide an interface to operationally connect a plurality of access and lockout switches 142 to an electronic controller unit 144 of the machine 100. It will be apparent to a person having ordinary skill in the art that the plurality of access and lockout switches 142 may control various operational parameters of the machine 100 via the electronic controller unit 144.

Figure 2:
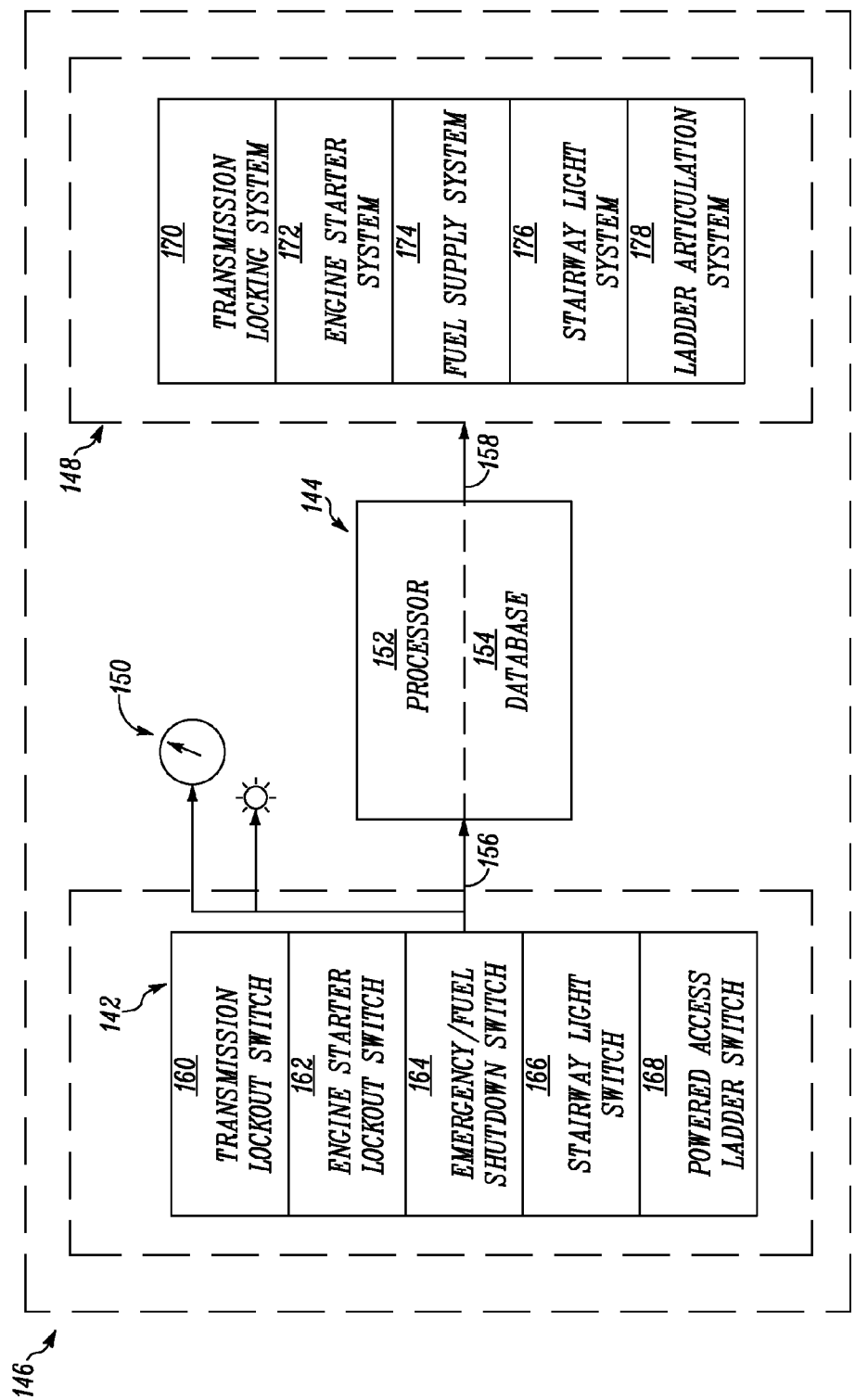
FIG. 2 illustrates a schematic representation of a control system for the machine according to an embodiment of the present disclosure.

Referring now to FIG. 2, a control system 146 for operating a plurality of machine systems 148 is schematically illustrated. The control system 146 may include the access and lockout switches 142, the electronic controller unit 144 and one or more monitoring devices 150. The electronic controller unit 144 may include a processor 152 and a database 154 for storing a set of electronic instructions to be used by the processor 152. The plurality of machine systems 148 are operatively connected to the access and lockout switches 142 via the electronic controller unit 144. The electronic controller unit 144 is configured to receive input signals 156 from the access and lockout switches 142 and in-turn sends control signals 158 to the machine systems 148 to activate or deactivate one or more associated machine systems 148. In an exemplary embodiment, the access and lockout switches 142 may include, but are not limited to, a transmission lockout switch 160, an engine starter lockout switch 162, an emergency/fuel shutdown switch 164, a stairway light switch 166, and a powered access ladder switch 168. In the exemplary embodiment, the machine systems 148 may include, but are not limited to, transmission locking system 170, engine starter system 172, fuel supply system 174, stairway light system 176, powered access ladder articulation system 178 and various other controls associated with the machine 100. The monitoring devices 150 may include a one or more gauges and indicators (not shown) mounted within the operator's cab 110 in a conventional manner.

Figure 4:
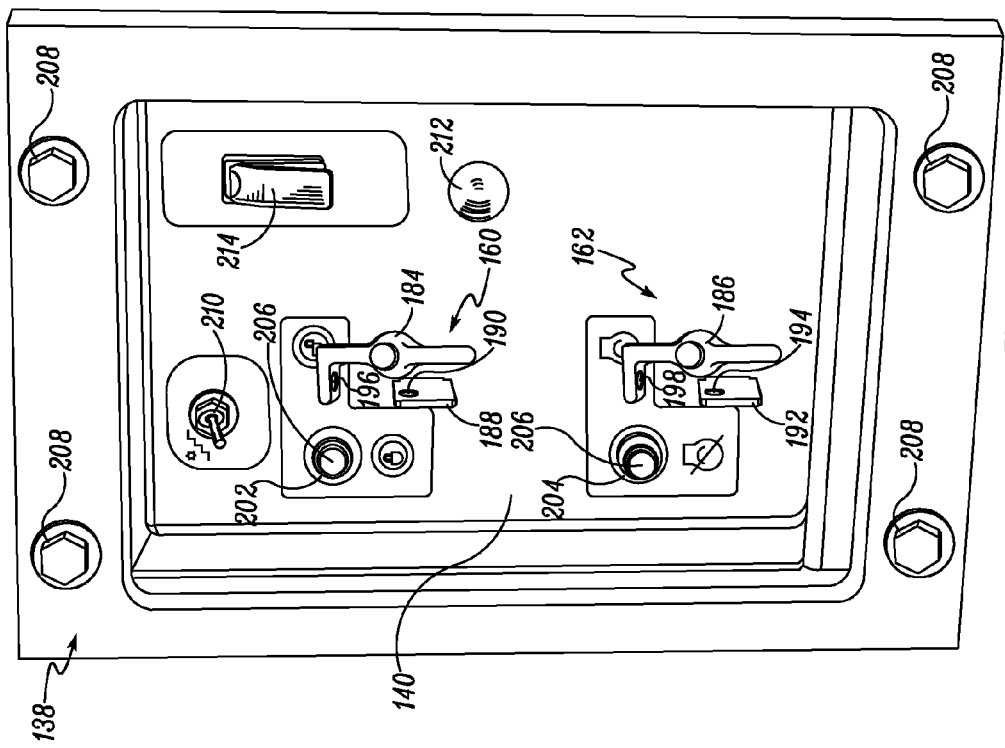
FIG. 4 illustrates a perspective view of a service control center according to an embodiment of the present disclosure.
Figure 3:
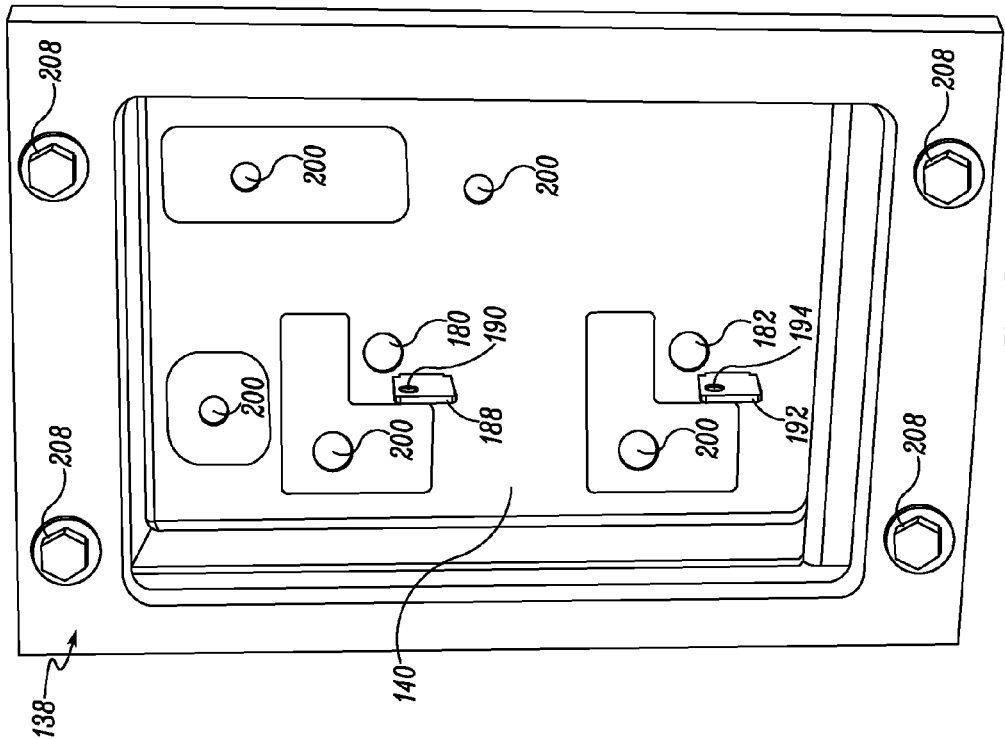
FIG. 3 illustrates a perspective view of a service control panel according to an embodiment of the present disclosure.

Referring to FIGS. 3 and 4, the service control center 138 having the service control panel 140 may be herein described in detail according to an embodiment of the present disclosure. As illustrated in FIG. 3, a first opening 180 and a second opening 182 may be provided on the service control panel 140 and configured to receive a first rotary switch and a second rotary switch, respectively. As illustrated in FIG. 4, the first rotary switch may be the transmission lockout switch 160 which is adapted to lock or unlock the transmission locking system 170. Further, the second rotary switch may be the engine starter lockout switch 162 which is adapted to lock or unlock the engine starter system 172. In an embodiment, the transmission lockout switch 160 and the engine starter lockout switch 162 may include respective first and second operating levers 184 and 186.

Moreover, a first flange 188 with a first aperture 190 and a second flange 192 with a second aperture 194 may be provided adjacent to the first opening 180 and the second opening 182, respectively. As illustrated in FIG. 4, in an aspect of the present disclosure, the first operating lever 184 may also include a first opening 196 configured to be aligned with the first aperture 190 of the first flange 188 while the first operating lever 184 is in a locked position. The second operating lever 186 may include a second opening 198 configured to be aligned with the second aperture 194 of the second flange 192 while the second operating lever 186 is in a locked position.

Further, plurality of openings 200 (see FIG. 3) may be provided on the service control panel 140 for receiving at least one of the emergency/fuel shutdown switch 164, the stairway light switch 166, the powered access ladder switch 168, a transmission lockout indicator 202, and an engine starter lockout indicator 204 as illustrated in FIG. 4. Alternatively, plurality of indicators may be provided on the service control panel 140 to indicate a working condition of various machine systems 148. The transmission lockout indicator 202 and the engine starter lockout indicator 204 may include, but not limited to, a light bulb, an audible alarm, a button, a digital display. Further, at least one of the transmission lockout indicator 202 or the engine starter lockout indicator 204 may have a push means 206 for testing for proper functioning of the transmission lockout indicator 202 and the engine starter lockout indicator 204. For example, when the transmission lockout indicator 202 or the engine starter lockout indicator 204 is properly functioning, the light bulb in the respective indicators is lit. However, if an operator notices that one of the lights is off, this could either mean that there is a malfunction in the transmission or starter, or that the light bulb has burned out. Before initiating a time consuming and costly investigation into the transmission or starter, if the push means 206 is depressed, the light bulb in the transmission lockout indicator 202 or the engine starter lockout indicator 204 will be provided with power to light the bulb regardless of the functional state of the transmission or starter. If the light bulb does not light, it would indicate that the light bulb has burned out and the operator can simply replace the bulb. Once the burned out bulb has been replaced the operator can assess the proper functioning of the transmission lockout indicator 202 and the engine starter lockout indicator 204. The service control panel 140 may be mounted on to the machine 100 via one or more fasteners 208 such as, but not limited to, bolts.

In an exemplary embodiment, a toggle switch 210 may be provided on the service control panel 140 for functioning as the stairway light switch 166, a push-button 212 may be provided on the service control panel 140 for functioning as the powered access ladder switch 168. Moreover, a rocker switch 214 may be provided on the service control panel 140 for functioning as the emergency/fuel shutdown switch 164. It will be apparent to a person having ordinary skill in the art that other types of switches and input devices can be used as the access and lockout switches 142.

Figure 5:
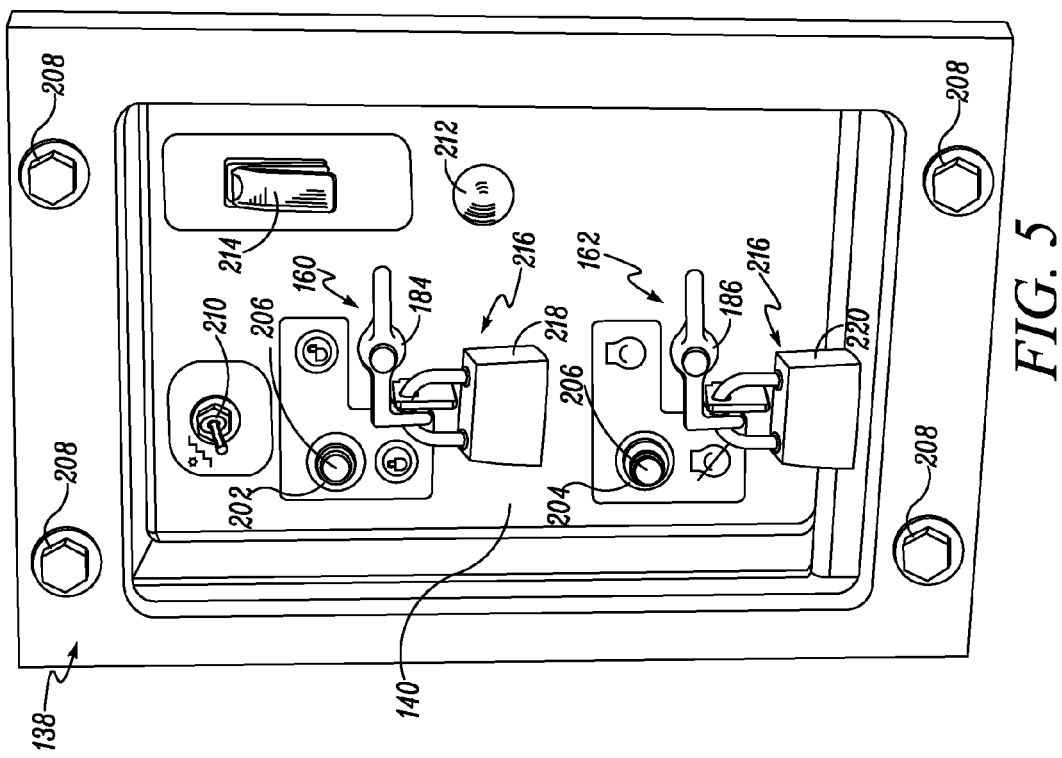
FIG. 5 illustrates a perspective view of a service control center and locking mechanism according to an embodiment of the present disclosure.

According to FIG. 5, the first rotary switch 160 and the second rotary switch 162 may be locked individually by a locking mechanism 216. Thus, an operator or service technician can prevent the first rotary switch 160 and the second rotary switch 162 from being turned to the UNLOCK position by another individual, thereby allowing the operator or service technician to safely service the machine 100. A person skilled in the art may understand that, the rotary switches may utilize a "star wheel" mechanism to provide other switching positions, apart from the LOCK or the UNLOCK position. The locking mechanism 216 may include a first locking mechanism 218 and the second locking mechanism 220. The first locking mechanism 218 and the second locking mechanism 220 may be portable locks, but not limited, to padlocks. Alternatively, electronic or digital locking may also be used for locking the first rotary switch 160 and the second rotary switch 162 individually. In an embodiment, the first locking mechanism 218 may be configured to pass through the first opening 196 aligned with the first aperture 190 of the first flange 188. Similarly, the second locking mechanism 220 may be configured to pass through the second opening 198 aligned with the second aperture 194 of the second flange 192.

In an embodiment, the emergency/fuel shutdown switch 164, the stairway light switch 166, and the powered access ladder switch 168 may also be locked individually by the similar locking mechanisms. Alternatively, in addition to the individual switch locking, the service control panel 140 may be locked externally by an outdoor door (not shown) using a hasp assembly. Further, a transparent panel may be disposed in the door of the service control panel 140. The transparent panel is positioned to allow visual inspection of the inside of the individually locked rotary switches of the service control panel 140.

INDUSTRIAL APPLICABILITY

The present disclosure relates to a service control panel with rotary switches adapted for use with a machine which is easily accessible for a technician or an operator during repair or service maintenance. In operation the present disclosure provides a method and apparatus for causing activation or deactivation of the machine systems 148. In an exemplary embodiment, the rotary switches may be operated to different positions so as to enable or disable or operate in a desired mode of operation of one or more of the machine systems 148, such transmission locking system 170, engine starter system 172, fuel supply system 174, stairway light system 176, powered access ladder articulation system 178 and various other controls associated with the machine 100.

The service control center 138 may be mounted anywhere onto the machine 100 via the fasteners 208, so that it is easily accessible for the technician or the operator preferably from the ground 118 and the platform 134. The first rotary switch 160 and the second rotary switch 162 may be locked individually by the first locking mechanism 218 and the second locking mechanism 220 so that only concerned technicians may operate their assigned machine systems 148 thereby preventing unauthorized access or input to the other access and lockout switches 142 or machine systems 148. For example, the technician allotted to transmission locking system 170 may have the access to operate the first rotary switch 160. Similarly, the technician allotted to engine starter system 172 may have the access to operate the second rotary switch 162.

Based on the input from the first rotary switch 160, the electronic controller unit 144 maintains the transmission locking system 170 in the LOCK or UNLOCK position or in the desired gear ratio. In the LOCK position, the transmission locking system 170 is prevented from being engaged into a gear wheel. The first rotary switch 160 may not allow the transmission to shift out of neutral condition, even if the machine 100 is in running condition for safety purposes of the operator or service technician while performing service or maintenance operations. Similarly, inputs from the second rotary switch 162 may send signals to the electronic controller unit 144 to maintain the engine starter system 172 in the LOCK or UNLOCK position. In the LOCK position, the machine 100 may cutoff power to starters so that the engine may not attempt to run the power. The emergency/fuel shutdown switch 164 or emergency kill switch prevents the fuel supply system 174 from being injected in case of any accident or emergency. The powered access ladder switch 168 may control the powered ladder articulation system 178. It should be noted, additional machine systems 148 associated with different operations of the machine 100 may be programmed to be enabled or disabled using the service control panel 140, including, but not limited to, dump body hoist, parking brake lock and back-up steering system.

The transmission lockout indicator 202 and the engine starter lockout indicator 204 is preferably a status light bulb, which is lit when the machine systems 148 are operating properly in association with the access and lockout switches 142. Further, the push means 206 is operated with the transmission lockout indicator 202 and the engine starter lockout indicator 204 for testing the status light bulb. On depressing the push means 206, the light bulbs glows independent of the operation of the machine systems 148, thus indicating the working condition of the bulb. If the status light glows on depression, it indicates that the bulbs are working properly and similarly if the status light does not glow on depression, this indicates the status lights may need to be changed by a new set of bulbs.

In an alternative embodiment, the service control center 138 may be locked externally by the outdoor panel (not shown) for additional authorization. Further, the transparent panel disposed in the door of the service control center 138 may allow visual inspection of the inside of the individually locked rotary switches of service control panel 140.

It will be apparent to those skilled in the art that various modifications and variations can be made to the disclosed service control panel without departing from the scope of the disclosure. Other embodiments of the service control panel will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for a machine having a transmission locking system and an engine starter system connected to an engine, the control system comprising:
    a first rotary switch to transmit a transmission lockout input signal to a processor, wherein the processor is programmed to transmit a transmission lockout control signal to the transmission locking system;
    a second rotary switch to transmit an engine starter lockout input signal to the processor, wherein the processor is programmed to transmit an engine starter lockout control signal to the engine starter system;
    a first flange having a first opening to retain the first rotary switch in a locked position; and
    a second flange having a second opening to retain the second rotary switch in a locked position.

2. The service control center of claim 1, wherein the first rotary switch includes a first operating lever with a first aperture configured to be aligned with the first opening of the first flange in the locked position to receive a first locking mechanism.

3. The service control center of claim 1, wherein the second rotary switch includes a second operating lever with a second aperture configured to be aligned with the second opening of the second flange in the locking position to receive a second locking mechanism.

4. The service control center of claim 1, wherein the first rotary switch and the transmission locking system are configured to be operatively connected by an electronic controller unit.

5. The service control center of claim 1, wherein the second rotary switch and the engine starter system are configured to be operatively connected by the electronic controller unit.

6. The service control center of claim 1 further includes a stairway light switch, an emergency/fuel shutdown switch and a powered access ladder switch.

7. The service control center of claim 1, wherein a transmission lockout indicator and an engine starter lockout indicator are provided on the service control panel.

8. The service control center of claim 7, wherein the transmission lockout indicator and the engine starter lockout indicator is at least one of a light bulb, an audible alarm, a button, or a digital display.

9. The service control center of claim 8, wherein a push means is provided on the transmission lockout indicator and the engine starter lockout indicator for testing working condition of the light bulb.

10. A control system for a machine comprising:
    a service control panel, wherein the service control panel includes a first rotary switch and a second rotary switch;
    a machine system, wherein the machine system includes a transmission locking system and an engine starter system connected to an engine;
        the first rotary switch to transmit a transmission lockout input signal to a electronic controller, wherein the electronic controller is programmed to transmit a transmission lockout control signal to the transmission locking system;

the second rotary switch to transmit an engine starter lockout input signal to the electronic controller, wherein the electronic controller is programmed to transmit an engine starter lockout control signal to the engine starter system; and a first flange having a first opening to retain the first rotary switch in a locked position; and a second flange having a second opening to retain the second rotary switch in a locked position.

11. The control system of claim 10, wherein the service control panel further includes a stairway light switch, an emergency/fuel shutdown switch and a powered access ladder switch.

12. The control system of claim 10, wherein the machine system further includes a fuel supply system, stairway light system, powered access ladder articulation system.

13. The control system of claim 10, wherein the first rotary switch includes a first operating lever with a first aperture configured to be aligned with the first opening of the first flange in the locked position to receive a first locking mechanism.

14. The control system of claim 10, wherein the second rotary switch includes a second operating lever with a second aperture configured to be aligned with the second opening of the second flange in the locking position to receive a second locking mechanism.

15. The control system of claim 11, wherein a transmission lockout indicator and an engine starter lockout indicator are provided on the service control panel.

16. The control system of claim 11, wherein the transmission lockout indicator and the engine starter lockout indicator is at least one of a light bulb, an audible alarm, a button, or a digital display.

17. A machine having a transmission locking system, an engine starter system connected to an engine and a service control center, the service control center comprising:

a service control panel including:

a first rotary switch to transmit a transmission lockout input signal to a processor, wherein the processor is programmed to transmit a transmission lockout control signal to the transmission locking system;

a second rotary switch to transmit an engine starter lockout input signal to the processor, wherein the processor is programmed to transmit an engine starter lockout control signal to the engine starter system;

a first flange having a first opening to retain the first rotary switch in a locked position; and a second flange having a second opening to retain the second rotary switch in a locked position.

18. The machine of claim 17, wherein the first rotary switch includes a first operating lever with a first aperture configured to be aligned with the first opening of the first flange in the locked position to receive a first locking mechanism.

19. The machine of claim 17, wherein the second rotary switch includes a knob with a second aperture configured to be aligned with the second opening of the second flange in the locking position to receive a second locking mechanism.

20. The machine of claim 17, wherein the first rotary switch and the transmission locking system are configured to be operatively connected by an electronic controller unit.

* * * * *